US011265286B2

(12) United States Patent
Mermoud et al.

(10) Patent No.: US 11,265,286 B2
(45) Date of Patent: Mar. 1, 2022

(54) TRACKING OF DEVICES ACROSS MAC ADDRESS UPDATES

(71) Applicant: Cisco Technology, Inc., San Jose, CA (US)

(72) Inventors: Grégory Mermoud, Veyras VS (CH); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 16/392,869

(22) Filed: Apr. 24, 2019

(65) Prior Publication Data
US 2020/0344203 A1 Oct. 29, 2020

(51) Int. Cl.
*H04L 29/12* (2006.01)
*H04L 29/08* (2006.01)
*H04L 61/5014* (2022.01)
*H04L 61/5076* (2022.01)
*H04L 67/02* (2022.01)
*H04L 101/622* (2022.01)

(52) U.S. Cl.
CPC ...... *H04L 61/2015* (2013.01); *H04L 61/2076* (2013.01); *H04L 67/02* (2013.01); *H04L 61/6022* (2013.01)

(58) Field of Classification Search
None
See application file for complete search history.

(56) References Cited

U.S. PATENT DOCUMENTS

| 7,248,568 | B1* | 7/2007 | Loc | H04W 76/14 370/312 |
|---|---|---|---|---|
| 8,504,879 | B2 | 8/2013 | Poletto et al. | |
| 9,501,777 | B1 | 11/2016 | Liu | |
| 10,198,625 | B1* | 2/2019 | Shin | G06K 9/00255 |
| 2006/0165095 | A1* | 7/2006 | Samprathi | H04L 43/0817 370/395.53 |
| 2007/0136412 | A1* | 6/2007 | Oba | G06F 40/143 709/200 |

(Continued)

OTHER PUBLICATIONS

Benzaïd, et al., "Intelligent Detection of MAC Spoofing Attack in 802.11 Network", ICDCN '16: Proceedings of the 17th International Conference on Distributed Computing and Networking, Jan. 2016, Article No. 47, 5 pages.

(Continued)

*Primary Examiner* — Younes Naji
(74) *Attorney, Agent, or Firm* — Behmke Innovation Group LLC; Kenneth J. Heywood; Jonathon P. Western

(57) ABSTRACT

In one embodiment, a service maintains a database of media access control (MAC) addresses of devices in a network and their associated telemetry data captured from the network. The service identifies a new MAC address being used by a particular device in the network. The service matches telemetry data associated with the new MAC address with telemetry data in the database associated with another MAC address, by using the telemetry data associated with the new MAC address as input to a machine learning-based classifier. The service determines, based on the matching, that the MAC address in the database associated with the matched telemetry data has been updated to the new MAC address by the particular device.

18 Claims, 7 Drawing Sheets

(56) References Cited

U.S. PATENT DOCUMENTS

| | | | | |
|---|---|---|---|---|
| 2007/0156877 A1* | 7/2007 | Krishnan | ............ | H04L 67/1097 |
| | | | | 709/223 |
| 2007/0234115 A1* | 10/2007 | Saika | ................. | G06F 11/2028 |
| | | | | 714/13 |
| 2009/0265455 A1* | 10/2009 | Hiraki | ................. | H04L 61/2038 |
| | | | | 709/223 |
| 2016/0295372 A1* | 10/2016 | Kapicioglu | ............. | G06F 16/29 |
| 2017/0126705 A1* | 5/2017 | Mirashrafi | ............ | H04L 63/145 |
| 2018/0295519 A1 | 10/2018 | Nandha Premnath et al. | | |
| 2019/0306731 A1* | 10/2019 | Raghuramu | .......... | H04W 48/16 |

OTHER PUBLICATIONS

Yu, et al., "A Framework for Detecting MAC and IP Spoofing Attacks with Network Characteristics", 2016 International Conference on Software Security and Assurance (ICSSA), Aug. 2016, 5 pages, IEEE.

* cited by examiner

TRACKING OF DEVICES ACROSS MAC ADDRESS UPDATES

TECHNICAL FIELD

The present disclosure relates generally to computer networks, and, more particularly, to the tracking of devices across media access control (MAC) address updates.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory device. However, with the ever-increasing number of different types of devices on a network, the lack of a ground truth (e.g., a device of type X has behavioral profile Y) makes identifying the actual type of a device challenging.

The reliable tracking of devices in a network is critical for purposes of device type classification, policing, and network security. Typically, this is done by representing the various devices by the media access control (MAC) addresses which are, in principle, hardcoded for every network interface controller (MC) down to the hardware level. However, it is relatively easy nowadays to change the burned-in MAC address with a spoofed one. In addition, some device manufacturers also now randomize MAC addresses at every connection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
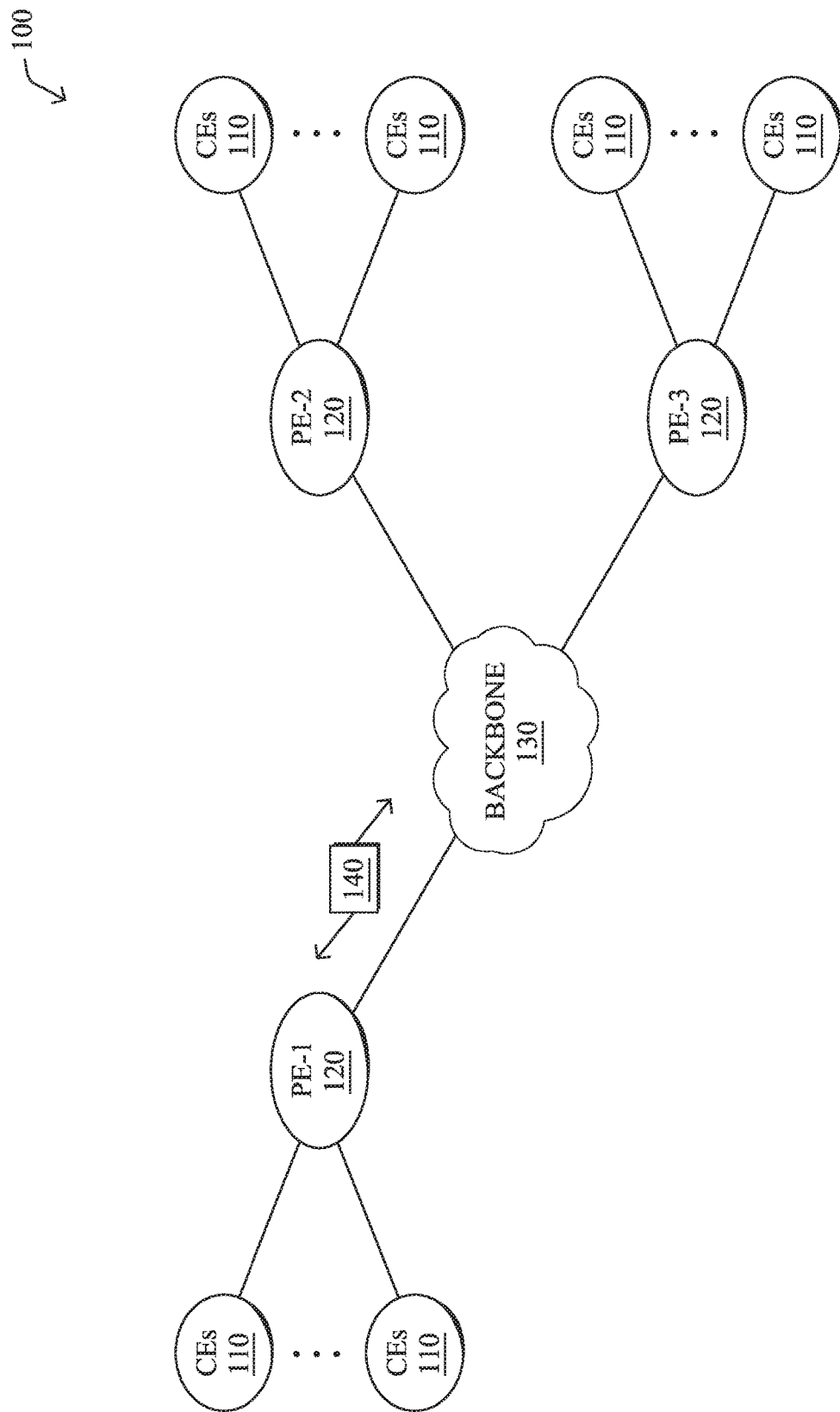
FIGS. 1A-1B illustrate an example communication network.

According to one or more embodiments of the disclosure, a service maintains a database of media access control (MAC) addresses of devices in a network and their associated telemetry data captured from the network. The service identifies a new MAC address being used by a particular device in the network. The service matches telemetry data associated with the new MAC address with telemetry data in the database associated with another MAC address, by using the telemetry data associated with the new MAC address as input to a machine learning-based classifier. The service determines, based on the matching, that the MAC address in the database associated with the matched telemetry data has been updated to the new MAC address by the particular device.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two primary links of a CLE router (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
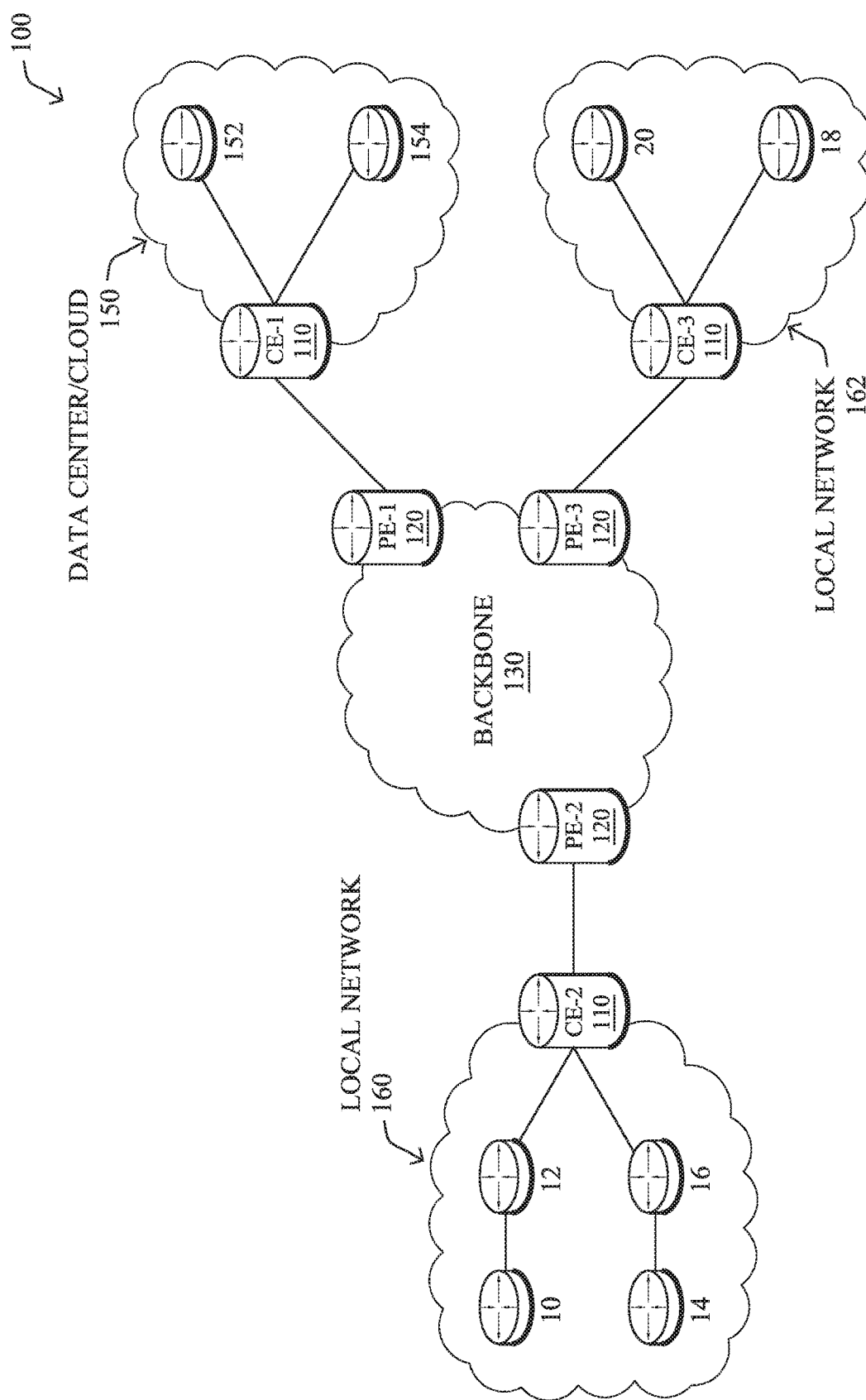

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
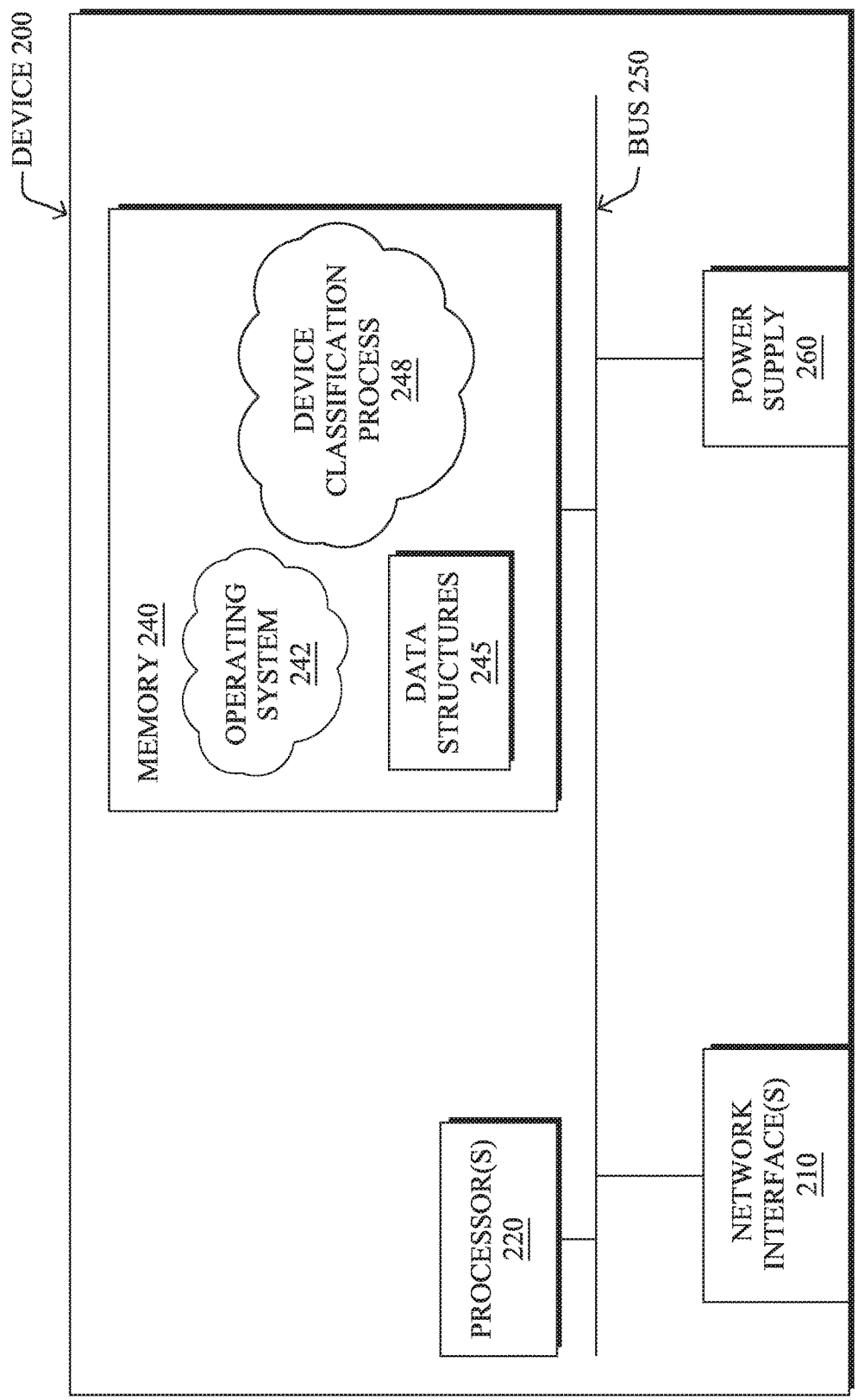
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
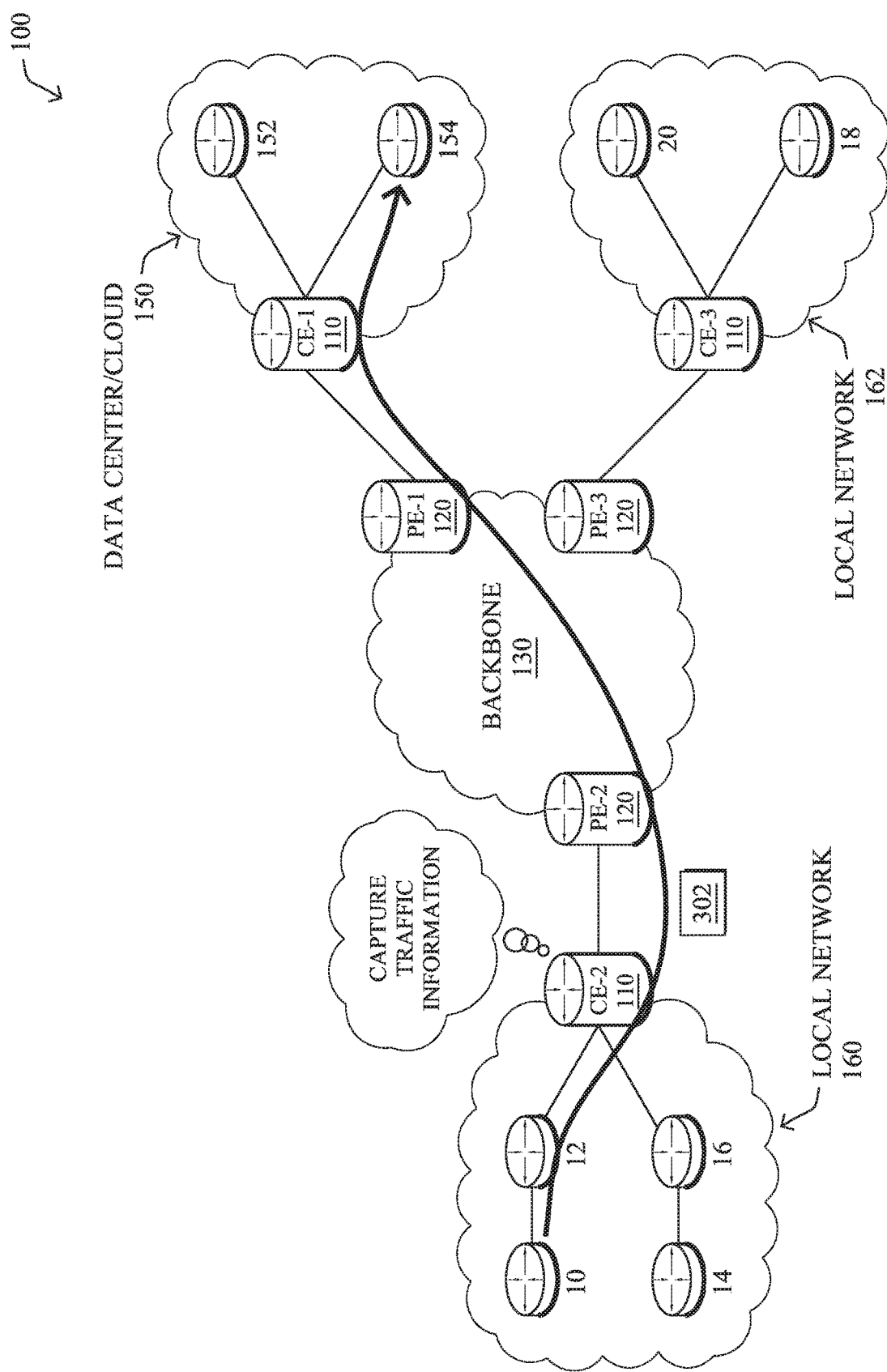
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
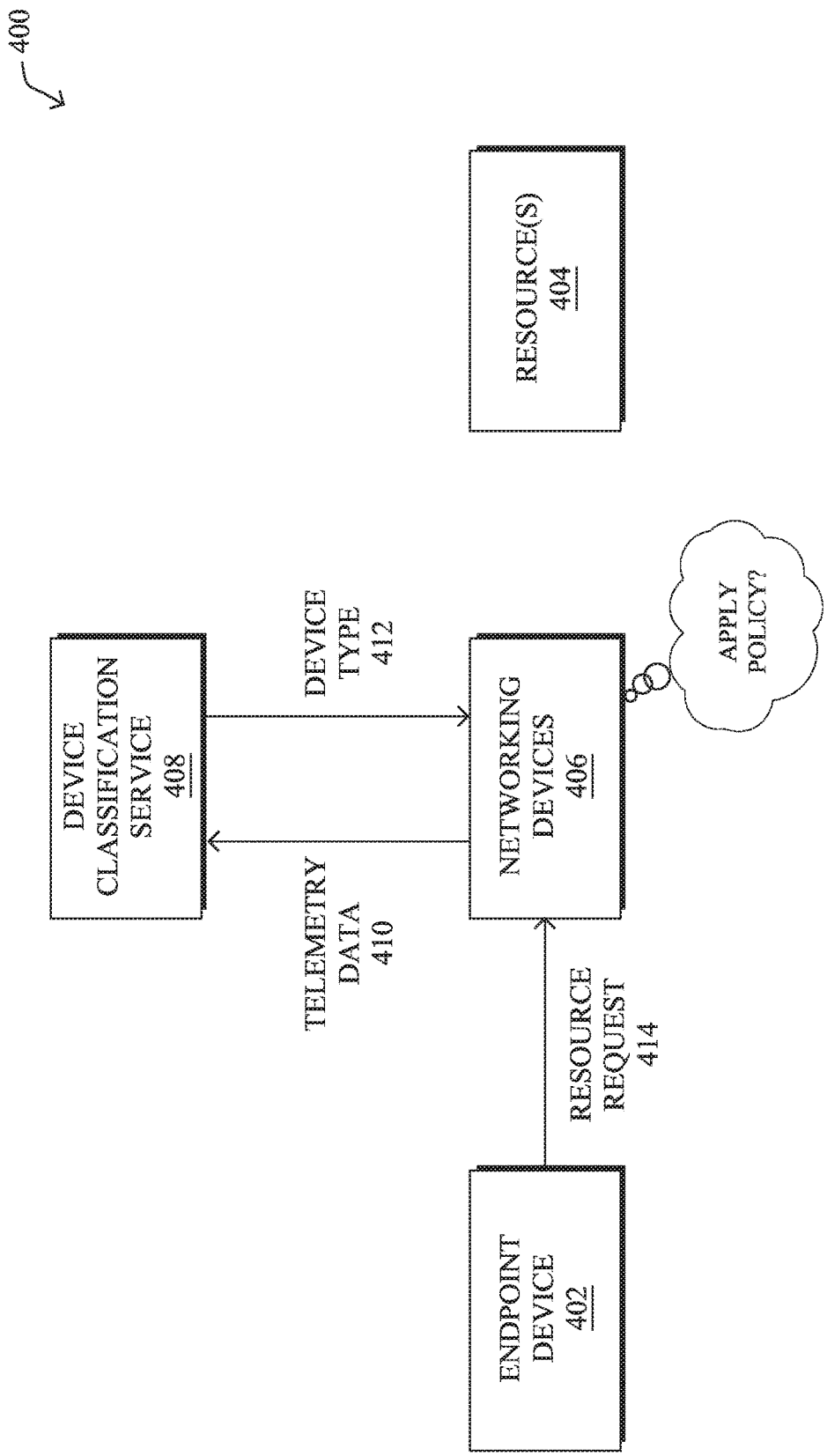
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also in FIG. 4 is a device classification service 408 that may be hosted on one or more of networking devices 406 or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

A device classification service may also leverage machine learning to label endpoint devices in a network with device types. Preliminary testing has shown that machine learning is particularly well suited for this purpose, as the classifier is able to label new endpoint devices, if their behaviors are similar to those of previously labeled endpoint devices. For example, the device type classifier may include a multi-class classification model such as a decisions tree based model (e.g., a random forest, etc.) trained using telemetry samples labeled with the known device types of their associated endpoint devices. In further cases, the device type classifier may leverage a machine learning-based clustering approach that uses the traffic telemetry data as input and attempts to group similarly behaving devices by their network traffic behaviors. The classifier can then propagate the device type labels of known endpoint devices to other endpoint devices in their behavioral clusters. For example, if an endpoint device under scrutiny belongs to a particular behavioral cluster based on its traffic telemetry, and that cluster includes one or more endpoint devices known to have a particular device type, the endpoint device under scrutiny can also be labeled with that device type.

As noted above, the reliable tracking of devices in a network is critical for purposes of device type classification, policing, and network security. Typically, this is done by representing the various devices by the media access control (MAC) addresses which are, in principle, hardcoded for every network interface controller (NIC) down to the hardware level. However, it is relatively easy nowadays to change the burned-in MAC address with a spoofed one. In addition, some device manufacturers also now randomize MAC addresses at every connection. As a result of a MAC address update by a device, the network may incorrectly treat its new MAC address as being a completely new device, leading to a fresh classification of its device type and creating the possibility of the device being misclassified over time.

Tracking of Devices Across MAC Address Updates

The techniques herein introduce a machine learning-based approach to identify and track devices across MAC address updates, using behavioral analytics. In some aspects, the techniques herein can also detect security threats, such as MAC address spoofing. As would be appreciated, tracking devices across MAC address updates is critical for the efficient operation of device classification systems, policers, and security systems.

Specifically, according to one or more embodiments of the disclosure as described in detail below, a service maintains a database of media access control (MAC) addresses of devices in a network and their associated telemetry data captured from the network. The service identifies a new MAC address being used by a particular device in the network. The service matches telemetry data associated with the new MAC address with telemetry data in the database associated with another MAC address, by using the telemetry data associated with the new MAC address as input to a machine learning-based classifier. The service determines, based on the matching, that the MAC address in the database associated with the matched telemetry data has been updated to the new MAC address by the particular device.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 5:
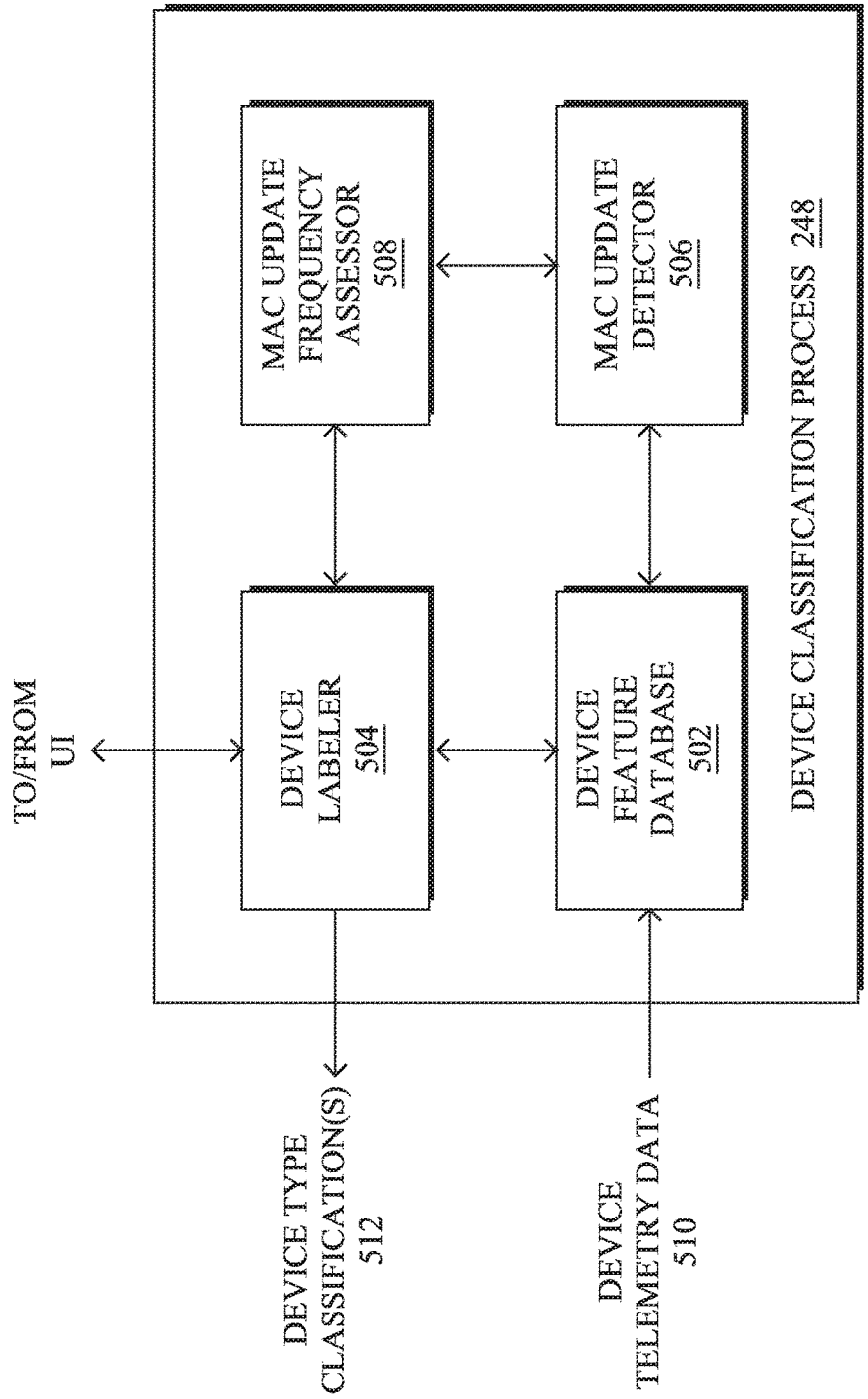
FIG. 5 illustrates an example architecture for tracking devices across media access control (MAC) address updates.

Operationally, FIG. 5 illustrates an example architecture 500 for tracking devices across MAC address updates, according to various embodiments. As shown, device classification process 248 may include any or all of the following components: device feature database 502, device labeler 504, MAC update detector 506, MAC update frequency assessor 508. These components 502-508 may be implemented in a distributed manner or implemented on a single device. In addition, some or all of components 502-508 may be implemented as part of a monitored network (e.g., at the network edge) or part of a cloud-based device classification service. The functionalities of the components of architecture 500 may also be combined, omitted, or implemented as part of other processes, as desired.

As shown, device classification process 248 may receive device telemetry data 510 regarding any number of devices undergoing device type classification. Such device telemetry data 510 may include, for example, the MAC addresses of the devices, traffic features captured from the devices' traffic (e.g., which protocols were used, source or destination information, which applications were executed by the devices, etc.), timing information (e.g., when the devices communicate, sleep, etc.), mobility information for the devices, and/or any other information regarding the devices that can be used to infer their device types. For example, device telemetry data 510 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device labeler 504 use device telemetry data 510 to output a device type classification 512 for a device under scrutiny, thereby allowing the receiving entity to apply network policies to the device, based on its device type classification 512. For example, one such network policy may cause a networking device to prevent an MRI machine from accessing the Internet via the network. For example, in some embodiments, device labeler 504 may apply machine learning-based behavioral clustering to the device telemetry data 510 of the devices and seek device type labels from an expert via a user interface (UI). In turn, device labeler 504 may apply a specified device type label to any new devices in the network that exhibit similar behaviors as those of a labeled cluster. For example, device labeler 504 may comprise a classifier that is trained on the labeled device clusters to label new devices in the network.

As noted above, MAC addresses are often used to uniquely identify devices in a network. In such cases, this means that a MAC address update by a device will typically be treated as a new device on the network. While a device may easily change its MAC address, there are several aspects that still allow tracking a device across MAC address updates. For starters, some behavioral characteristics of a device that cannot be controlled easily remain relatively permanent. These characteristics include information such as DHCP vendor class identifier or the HTTP user agent, which are not necessarily directly controlled by the same components of the operating system or application stack running on the device. Similarly, there are behavioral aspects of a device that may not vary much from connections to connections, in spite of its MAC address changing. For instance, application (i.e., which applications are executed, and at what time of the day) or mobility (i.e., how the device is moving in space) patterns are both quite specific to a given device or, more specifically, to its user. Conversely, devices that are not user-operated typically do not move as much and, therefore, their location can be useful to pinpoint their identity, temporarily.

Of course, a careful adversarial agent could modify all of these characteristics at once, thus making it look like that the new MAC address corresponds to a completely different device, but a "regular" device would most likely leave its behavioral characteristics unchanged after a MAC address update. At the same time, such behavioral attributes are not unique identifiers of a device but are only specific to a class of devices.

In various embodiments, device classification process 248 may maintain a device feature database 502 from the device telemetry data 510 captured regarding the devices in the network under scrutiny. In general, the entries in device feature database 502 may associate the MAC addresses of the devices in the network and their 'permanent' attributes, features, and/or behavioral characteristics that are expected to remain unchanged after a MAC address update under normal circumstances. For example, device feature database 502 may store device information such as DHCP vendor, HTTP user agent, applications executed by the devices (e.g., as identified from their captured traffic telemetry), mobility information, or the like. Such information could also comprise output from classifiers such as Power over Ethernet (PoE) classifiers used for fingerprinting devices, based on their power consumptions.

By way of example, for every individual MAC address, device classification process 248 may construct a vector $X_A(t)$ that represents the device with MAC address A at time t and stores it for future use in device feature database 502. Note that device feature database 502 would grow quite large, rapidly, especially if the network has a large number of devices. However, device classification process 248 does not need to store the device data forever. In particular, the history stored in device feature database 502 is not needed beyond a few changes of the device MAC address. Further, in some embodiments, device classification process 248 may disable MAC address update tracking for devices that device labeler 504 has labeled with a "stable" device type, i.e., a type of device that is unlikely to change its MAC address. For instance, an MRI machine is much less likely to change its MAC address than an iPhone.

In various embodiments, MAC update detector 506 may monitor device feature database 502, to determine whether a new MAC address on the network can be matched to a previous one in database 502. To do so, MAC update detector 506 may train a machine learning-based classifier that takes as input an aggregate vector $[X_A(t), X_B(t+1)]$ and predicts if A==B, possibly with a measure of uncertainty. To train this classifier, MAC update detector 506 may use the vectors $X_A(t)$ stored in device feature database 502 and construct a training dataset of positive examples $[X_A(t), X_A(t+1)]$ and negative examples $[X_A(t), X_B(t+1)]$, where A is clearly identified as the same device at time t and t+1, thus ensuring that B is a different device. Note that both positive and negative examples are needed for classifier training, in order to be able to train a model to recognize identical devices across MAC updates. Indeed, a classifier works better if the training dataset is well-balanced among positive and negative examples.

MAC update detector 506 may ensure that A is the same device at time t and t+1 using heuristics, such as an identity obtained from strong authentication using 802.1x or other sources of truth at the application layer. To make the dataset really useful, MAC update detector 506 may select pairs of devices that are actually very close in the feature space, thus forcing the classifier to extract the truly discriminating features.

When a new MAC address D appears on the network, as indicated by device telemetry data 510, MAC update detector 506 may evaluate it against a set of inactive devices in device feature database 502 and use its classifier to determine if there is a behavioral match (e.g., whether the telemetry data 510 for MAC address 1) matches that of any other MAC address in device feature database 502). For example, for a given inactive device X in device feature database 502, the classifier of MAC update detector 506 should return a positive label for the vector $[X_X(t), X_D(t+1)]$. In such a case, MAC update detector 506 may determine that both MAC addresses are for the same device, which has updated its MAC address to the new MAC address D.

In some cases, a new MAC address seen on the network may behave similarly to a plurality of MAC addresses in device feature database 502, meaning that MAC update detector 506 may match the telemetry data 510 for the new MAC address to that of multiple MAC addresses. When this happens, MAC update detector 506 may select the one with the highest probability score or the lowest uncertainty, as determined by the classifier. When MAC update detector 506 confirms a match, it may restore all states for that device from its history. For example, if device labeler 504 previously labeled the device as being an iPhone, under its previous MAC address, MAC update detector 506 may also associate this device type label with its new MAC address. Similarly, any access or other security policies that may have been associated with the device prior to its MAC address update may be propagated to its new MAC address, as well.

This is particularly important for security and policy services which rely on accurate tracking of devices for their proper functioning.

In some embodiments, device classification process 248 may also include MAC update frequency assessor 508, which is configured to assess the frequency of MAC address updates by the different devices in the network, based on the output of MAC update detector 506. Indeed, abnormally high rates might be indicative of a security threat from the device as it attempts to evade tracking and policing, or, worse, as it attempts to impersonate another known device. This latter situation can be detected by focusing on examples where the same MAC address is being rejected as corresponding to the same device, i.e., the example $[X_A(t), X_A(t+1)]$ is classified as a negative. If the MAC update frequency of a given device exceeds a predefined threshold, MAC update frequency assessor 508 may initiate any number of corrective measures, such as generating an alert that process 248 can send to a security service or security operator (e.g., via the UI) for further action.

Figure 6:
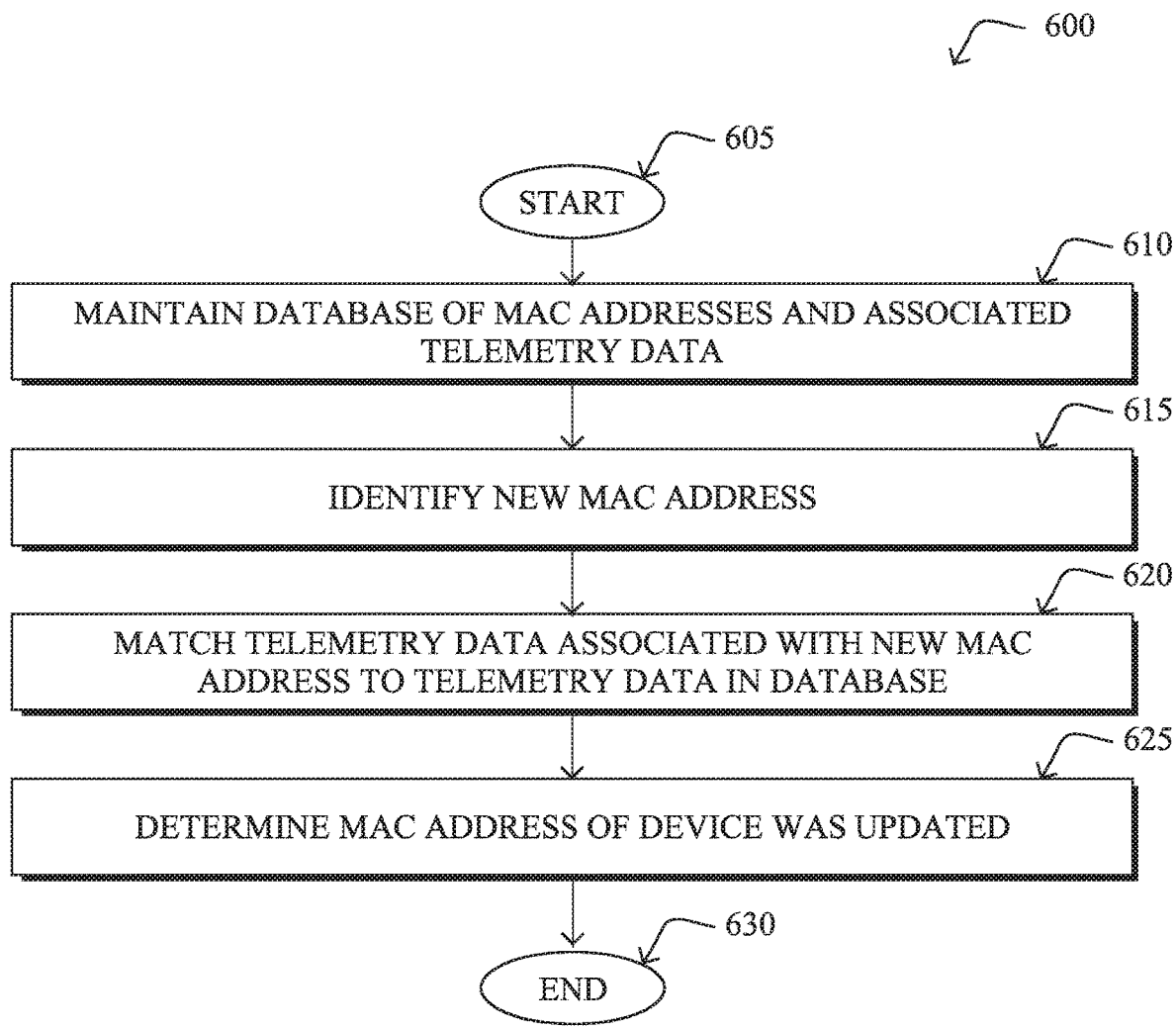
FIG. 6 illustrates an example simplified procedure for determining that a MAC address update has occurred.

FIG. 6 illustrates an example simplified procedure for determining that a MAC address update has occurred, in accordance with one or more embodiments described herein. For example, a non-generic, specifically configured device (e.g., device 200) may perform procedure 800 by executing stored instructions (e.g., process 248), to provide a service to one or more networks, either locally or in the cloud. For example, the service may be a device classification service, in some embodiments. The procedure 600 may start at step 605, and continues to step 610, where, as described in greater detail above, the service maintains a database of media access control (MAC) addresses of devices in a network and their associated telemetry data captured from the network. In general, the telemetry data stored in the database may be of any form that is expected to remain the same after a MAC address update by a device. Example telemetry data may include, but is not limited to, any or all of the following: the application(s) executed by the device, mobility patterns of the device, the HTTP user agent specified in traffic of the device, or a DHCP vendor class identifier used in traffic of the device. As would be appreciated, other forms of telemetry data can also be captured in the network and stored in the database, as well.

At step 615, as detailed above, the service may identify a new MAC address being used by a particular device in the network. For example, the service may compare the MAC address from telemetry data captured in the network to the database from step 610, to determine that the particular device is using a new MAC address (e.g., a MAC address that is unrecognized by the service).

At step 620, the service may match telemetry data associated with the new MAC address with telemetry data in the database associated with another MAC address, by using the telemetry data associated with the new MAC address as input to a machine learning-based classifier. Such a classifier may be trained, for example, using positive and negative examples of MAC address updates from the database of step 610. In some cases, the service may match the telemetry data associated with the new MAC address with telemetry in the database associated with a plurality of MAC addresses. In such cases, the service may select one of the plurality of MAC addresses as associated with the new MAC address, based on a probability score generated by the machine learning-based classifier for each match. In further embodiments, the service may only consider MAC addresses in the database whose corresponding devices have been inactive in the network for a threshold amount of time. For example, the service may first identify, from the database, a set of MAC addresses of devices that have been inactive on the network for a threshold amount of time. In turn, the service may use the classifier to compare the telemetry data associated with the new MAC address to the telemetry data associated with the set of inactive MAC addresses.

At step 625, as detailed above, the service may determine, based on the matching, that the MAC address in the database associated with the matched telemetry data has been updated to the new MAC address by the particular device. In such cases, the service may restore the device to its previous state in the network in terms of access and/or other network policies. For example, if the service is a device classification service, it may assign the device type previously assigned to the device's prior MAC address to its new address, so that the network can apply the appropriate policy to the device. In some embodiments, based on the device type of the particular device, the service may also disable further MAC address update tracking for the device. Notably, certain types of devices (e.g., medical devices, etc.) rarely, if ever, change their MAC addresses. In further embodiments, the service may also compute a frequency of MAC address updates by the particular device and generate an alert when the computed frequency of MAC address updates by the particular device exceeds a predefined threshold. Procedure 600 then end at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the tracking of devices in a network across MAC address updates. By doing so, the prior information about a device can be propagated to the new MAC address, allowing the network to continue to apply the same policies to the device, after its MAC address update.

While there have been shown and described illustrative embodiments that provide for tracking devices across MAC updates, it is to be understood that various other adaptations and modifications may be made within the spirit and scope of the embodiments herein. For example, while certain embodiments are described herein with respect to using certain models for purposes of device type classification or matching device behaviors across MAC updates, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
maintaining, by a service, a database of media access control (MAC) addresses of devices in a network and their associated telemetry data captured from the network;
determining, by the service and using the database, that a MAC address being used by a particular device in the network is unrecognized, wherein the unrecognized MAC address is identified as a new MAC address;
in response to identifying the new MAC address, matching, by the service, telemetry data associated with the new MAC address with telemetry data in the database associated with another MAC address, by using the telemetry data associated with the new MAC address as input to a machine learning-based classifier; and
determining, by the service and based on the matching, that the other MAC address in the database associated with the matched telemetry data has been updated to the new MAC address by the particular device,
wherein matching telemetry data associated with the new MAC address with telemetry data in the database comprises:
matching the telemetry data associated with the new MAC address with telemetry in the database associated with a plurality of MAC addresses; and
selecting one of the plurality of MAC addresses as associated with the new MAC address, based on a probability according to the machine learning-based classifier for each match.

2. The method as in claim 1, wherein the captured telemetry data is indicative of a Hypertext Transfer Protocol (HTTP) user agent or Dynamic Host Configuration Protocol (DHCP) vendor class identifier.

3. The method as in claim 1, wherein the captured telemetry data is indicative of an executed application or mobility pattern.

4. The method as in claim 1, wherein the service is a device classification service configured to identify a device type of a device, and wherein the method further comprises:
assigning, by the service, a device type to the new MAC address, based on the service previously assigning the device type to the other MAC address in the database that is associated with the matched telemetry data.

5. The method as in claim 1, further comprising:
computing, by the service, a frequency of MAC address updates by the particular device; and
generating, by the service, an alert when the computed frequency of MAC address updates by the particular device exceeds a predefined threshold.

6. The method as in claim 1, wherein the service is a device classification service configured to identify a device type of a device, and wherein the method further comprises:
disabling, by the service, tracking of MAC address updates by the particular device, based on a device type of the particular device identified by the service.

7. The method as in claim 6, wherein the device type of the particular device is used to apply an access policy to the particular device in the network.

8. An apparatus, comprising:
one or more network interfaces to communicate with a network;
a processor coupled to the one or more network interfaces and configured to execute a process; and
a memory configured to store the process executable by the processor, the process when executed configured to:
maintain a database of media access control (MAC) addresses of devices in a network and their associated telemetry data captured from the network;
determine, using the database, that a MAC address being used by a particular device in the network is unrecognized, wherein the unrecognized MAC address is identified as a new MAC address;
in response to identifying the new MAC address, match telemetry data associated with the new MAC address with telemetry data in the database associated with another MAC address, by using the telemetry data associated with the new MAC address as input to a machine learning-based classifier; and
determine, based on the matching, that the other MAC address in the database associated with the matched telemetry data has been updated to the new MAC address by the particular device,
wherein the apparatus matches telemetry data associated with the new MAC address with telemetry data in the database by:
matching the telemetry data associated with the new MAC address with telemetry in the database associated with a plurality of MAC addresses; and
selecting one of the plurality of MAC addresses as associated with the new MAC address, based on a probability according to the machine learning-based classifier for each match.

9. The apparatus as in claim 8, wherein the captured telemetry data is indicative of a Hypertext Transfer Protocol (HTTP) user agent, Dynamic Host Configuration Protocol (DHCP) vendor class identifier, an executed application, or mobility pattern.

10. The apparatus as in claim 8, wherein the apparatus matches the telemetry data associated with the new MAC address with telemetry data in the database associated with another MAC address by:
identifying, from the database, a set of MAC addresses of devices that have been inactive on the network for a threshold amount of time; and
using the classifier to compare the telemetry data associated with the new MAC address to the telemetry data associated with the set of inactive MAC addresses.

11. The apparatus as in claim 8, wherein the apparatus provides a device classification service to the network that is configured to identify a device type of a device, and wherein the process when executed is further configured to:
assign a device type to the new MAC address, based on the service previously assigning the device type to the other MAC address in the database that is associated with the matched telemetry data.

12. The apparatus as in claim 8, wherein the apparatus provides a device classification service to the network that is configured to identify a device type of a device, and wherein the process when executed is further configured to:
disable tracking of MAC address updates by the particular device, based on a device type of the particular device identified by the apparatus.

13. The apparatus as in claim 12, wherein the device type of the particular device is used to apply an access policy to the particular device in the network.

14. The apparatus as in claim 8, wherein the process when executed is further configured to:
compute a frequency of MAC address updates by the particular device; and generate an alert when the computed frequency of MAC address updates by the particular device exceeds a predefined threshold.

15. A tangible, non-transitory, computer-readable medium storing program instructions that cause a service to execute a process comprising:

maintaining, by the service, a database of media access control (MAC) addresses of devices in a network and their associated telemetry data captured from the network;

determining, by the service and using the database, that a MAC address being used by a particular device in the network is unrecognized, wherein the unrecognized MAC address is identified as a new MAC address;

in response to identifying the new MAC address, matching, by the service, telemetry data associated with the new MAC address with telemetry data in the database associated with another MAC address, by using the telemetry data associated with the new MAC address as input to a machine learning-based classifier; and determining, by the service and based on the matching, that the other MAC address in the database associated with the matched telemetry data has been updated to the new MAC address by the particular device, wherein matching telemetry data associated with the new MAC address with telemetry data in the database comprises:

matching the telemetry data associated with the new MAC address with telemetry in the database associated with a plurality of MAC addresses; and selecting one of the plurality of MAC addresses as associated with the new MAC address, based on a probability according to the machine learning-based classifier for each match.

16. The computer-readable medium as in claim 15, wherein the captured telemetry data is indicative of a Hypertext Transfer Protocol (HTTP) user agent, Dynamic Host Configuration Protocol (DHCP) vendor class identifier, an executed application, or mobility pattern.

17. The computer-readable medium as in claim 15, further comprising:

computing, by the service, a frequency of MAC address updates by the particular device; and generating, by the service, an alert when the computed frequency of MAC address updates by the particular device exceeds a predefined threshold.

18. The computer readable medium as in claim 16, wherein the service is a device classification service configured to identify a device type of a device, and wherein the method further comprises:

disabling, by the service, tracking of MAC address updates by the particular device, based on a device type of the particular device identified by the service.

* * * * *

UNITED STATES PATENT AND TRADEMARK OFFICE
CERTIFICATE OF CORRECTION

PATENT NO. : 11,265,286 B2
APPLICATION NO. : 16/392869
DATED : March 1, 2022
INVENTOR(S) : Mermoud et al.

Page 1 of 1

It is certified that error appears in the above-identified patent and that said Letters Patent is hereby corrected as shown below:

In the Specification

Column 1, Line 50, please amend as shown:
controller (NIC) down to the hardware level. However, it is Column 12, Line 44, please amend as shown:
telemetry data 510 for MAC address D matches that of any Signed and Sealed this
Twenty-fourth Day of May, 2022

Katherine Kelly Vidal
*Director of the United States Patent and Trademark Office*